United States Patent [19]

Nakajima

[11] Patent Number: 4,873,437

[45] Date of Patent: Oct. 10, 1989

[54] RADIATION IMAGE READ-OUT METHOD AND APPARATUS

[75] Inventor: Nobuyoshi Nakajima, Kanagawa, Japan

[73] Assignee: Fuji Photo Film Co., Ltd., Kanagawa, Japan

[21] Appl. No.: 903,802

[22] Filed: Sep. 4, 1986

[30] Foreign Application Priority Data

Sep. 4, 1985 [JP] Japan .................. 60-195455

[51] Int. Cl.$^4$ .................. H04N 5/30; G01N 23/04
[52] U.S. Cl. .................. 250/327.2; 250/484.1
[58] Field of Search ........... 250/327.2, 484.1, 327.2 C, 250/327.2 D, 327.2 E, 327.2 F, 327.2 G, 484.1 B; 364/414, 413.13, 413.26; 382/22

[56] References Cited

FOREIGN PATENT DOCUMENTS 0170270 2/1986 European Pat. Off. ......... 250/327.2

*Primary Examiner*—Janice A. Howell
*Assistant Examiner*—Richard Hanig
*Attorney, Agent, or Firm*—Sughrue, Mion, Zinn, Macpeak & Seas

[57] ABSTRACT

In a radiation image read-out method and apparatus, a stimulable phosphor sheet carrying a radiation image stored thereon is exposed to stimulating rays which cause the stimulable phosphor sheet to emit light in proportion to the stored radiation energy, and the emitted light is photoelectrically detected. When radiation image read-out is conducted on a stimulable phosphor sheet subjected to subdivision image recording carried out by exposing many subdivisions on the stimulable phosphor sheet respectively to a radiation in radiation image recording, the respective subdivisions are discriminated on the basis of information on subdivision image recording. Conditions of image processing are determined for the respective discriminated subdivisions, and are adjusted for the respective subdivisions when image processing is conducted.

8 Claims, 3 Drawing Sheets

READ-OUT IMAGE SIGNAL
(LIGHT EMISSION AMOUNT)

RADIATION IMAGE READ-OUT METHOD AND APPARATUS

BACKGROUND OF THE INVENTION

1. Field of the Invention

This invention relates to a radiation image read-out method for exposing a stimulable phosphor sheet carrying a radiation image stored thereon to stimulating rays which cause the stimulable phosphor sheet to emit light in proportion to the stored radiation energy, photoelectrically detecting the emitted light, and thereby reading out the radiation image. This invention particularly relates to a radiation image read-out method wherein, when a radiation image is read out from a stimulable phosphor sheet subjected to subdivision image recording and an image processing is conducted on a read-out image signal thus obtained, image processing conditions are adjusted to a value suitable for the respective subdivisions in the subdivision image recording. This invention also relates to an apparatus for carrying out the method.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored thereon, and is then scanned with stimulating rays such as a laser beam which cause the stimulable phosphor sheet to emit light in proportion to the stored radiation energy. The light emitted by the stimulable phosphor sheet when it is exposed to stimulating rays is photoelectrically detected and converted into an electric image signal, which is processed as desired to reproduce a visible image on a recording medium such as a photographic film or on a display device such as a cathode ray tube (CRT).

The radiation image recording and reproducing system using a stimulable phosphor sheet is advantageous over conventional radiography in that the image can be recorded over a very wide range (latitude) of radiation exposure and further in that the electric signal used for reproducing the visible image can be freely processed to improve the image quality for viewing, particularly for diagnostic purposes. More specifically, since the amount of light emitted upon stimulation after the radiation energy is stored on the stimulable phosphor sheet varies over a wide range in proportion to the amount of said stored energy, it is possible to obtain an image having desirable density regardless of the amount of exposure of the stimulable phosphor sheet to the radiation, by reading out the emitted light with an appropriate read-out gain and converting it into an electric signal to reproduce a visible image on a recording medium or a display device. The electric signal may further be processed as desired to obtain a radiation image suitable for viewing, particularly for diagnostic purposes. This is very advantageous in practical use.

As mentioned above, in the radiation image recording and reproducing system using a stimulable phosphor sheet, compensation for deviation of the level of the radiation energy stored on the stimulable phosphor sheet from a desired level can easily be carried out by adjusting the read-out gain to an appropriate value when photoelectrically reading out the light emitted by the stimulable phosphor sheet upon stimulation thereof. Therefore, the quality of the reproduced radiation image is not adversely affected by a fluctuation in radiation dose due to fluctuating tube voltage or MAS value of the radiation source, variation in the sensitivity of the stimulable phosphor sheet or the photodetector, changes in radiation dose resulting from differences in the condition of the object, or differences in radiation transmittance of the object, and the like. Also, it is possible to obtain a desirable radiation image even when the radiation dose to the object is low. Further, it is possible to obtain a radiation image having a high image quality of high contrast, high sharpness and low noise, and the like, by converting the light emitted by the stimulable phosphor sheet into an electric signal, and processing the electric signal as desired.

However, in order to eliminate various influences caused by variations in radiographic exposure conditions and/or to obtain a radiation image having a high image quality or a high diagnostic efficiency and accuracy, it is necessary to investigate such image input conditions of the radiation image stored on the stimulable phosphor sheet as, for example, the level of radiation dose used for image recording, or the image input pattern which is determined by the portion of the object (e.g. the chest or the abdomen of the human body) or the image recording method used, such as plain image recording or contrasted image recording, before reproducing the radiation image to a visible image, and then to adjust the read-out gain to an appropriate value or the process the electric signal appropriately based on the detected image input conditions or the image input pattern. The image input conditions and the image input pattern will hereinafter be simply referred to as the image input information when they are referred to generically. It is also necessary to determine the scale factor to optimize the resolution in accordance with the contract of the image input pattern, and to adjust image processing conditions to appropriate values in the case where image processing such as gradation processing is conducted on the read-out image signal.

Investigation of the image input information may be conducted prior to the visible image reproduction by use of the method as disclosed in Japanese Unexamined Patent Publication No. 58(1983)-67240. In the disclosed method, a read-out operation for detecting the image input information of a radiation image stored on a stimulable phosphor sheet (hereinafter referred to as the preliminary read-out) is conducted in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter the final read-out is carried out. In the final read-out, the read-out gain and/or the scale factor is adjusted to an appropriate value, and/or an appropriate image processing is conducted, on the basis of the image input information obtained by the preliminary read-out.

As described above, the level of the stimulating rays used in the preliminary read-out is lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out, the output of the stimulating ray source such as a laser beam source may be decreased in the preliminary read-out, or the stimulating rays emitted by the stimulating ray source may be attenuated by an ND filter, an AOM, or the like, positioned in the optical path. Alternatively, a stimulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

In the aforesaid method, since the image input conditions and the image input pattern of a radiation image stored on the stimulable phosphor sheet can be investigated in advance, it is possible to obtain a radiation image having an improved image quality, particularly a high diagnostic efficiency and accuracy, by adjusting the read-out gain and the scale factor in the manner most suitable for the image input pattern on the basis of the detected image input information without using a read-out system having a wide dynamic range.

When a radiation image is recorded on the stimulable phosphor sheet, subdivision image recording is often carried out. In subdivision image recording, the recording region on the stimulable phosphor sheet is divided into a plurality of subdivisions, and the respective subdivisions are exposed to a radiation for image recording. Subdivision image recording is economical since, for example, when an image of a small object portion is recorded on a large stimulable phosphor sheet, images of a plurality of object portions may be recorded on a single stimulable phosphor sheet. Also, the radiation image recording and read-out processing speed becomes high.

However, in the case where the image processing conditions in the final read-out are adjusted based on the image input information obtained by the preliminary read-out when a radiation image stored on a stimulable phosphor sheet subjected to the subdivision image recording is read out, the image processing conditions become unsuitable for the radiation image. Specifically, preliminary read-out has heretofore been conducted over the entire recording region on the stimulable phosphor sheet or over a part thereof slightly smaller than the overall recording region. Therefore, the image processing conditions adjusted based on the preliminary read-out image signal obtained by the preliminary read-out become suitable for the whole radiation image stored on the stimulable phosphor sheet. However, in subdivision image recording, radiation doses to the respective subdivisions may differ greatly from each other. In such a case, the image processing conditions adjusted as described above may become unsuitable for the radiation images stored at some subdivisions. For example, in the case where the recording region on the stimulable phosphor sheet is divided into two subdivisions and radiation image recording is conducted by exposing one of the two subdivision to a markedly high radiation dose and exposing the other thereof to a markedly low radiation dose, the image processing conditions adjusted based on the preliminary read-out as mentioned above become suitable for an image of the middle level between the two radiation images actually stored at the subdivisions, and become unsuitable for both of the two radiation images.

The aforesaid problem is caused not only by a difference in radiation dose but also by a difference in the image recording portion of the object, the image recording method, or the like between the subdivisions of the recording region.

The aforesaid problem arises also when instead of conducting the preliminary read-out, the image input information is ascertained at the time of the final read-out and the image processing conditions are adjusted based on the image input information thus ascertained.

SUMMARY OF THE INVENTION

The primary object of the present invention is to provide a radiation image read-out method wherein, even though image input information differs markedly between a plurality of subdivisions of the recording region on a stimulable phosphor sheet, image processing conditions are adjusted to values appropriate for the respective image input information at the subdivisions.

Another object of the present invention is to provide a radiation image read-out method which always provides a reproduced visible image having an improved image quality, particularly a high diagnostic efficiency and accuracy.

The specific object of the present invention is to provide an apparatus for carrying out the radiation image read-out method.

The present invention provides a radiation image read-out method in which a stimulable phosphor sheet carrying a radiation image of an object stored thereon is exposed to stimulating rays, light emitted by the stimulable phosphor sheet in proportion to the stored radiation energy when the stimulable phosphor sheet is exposed to the stimulating rays is photoelectrically detected by a light detection means to obtain an image signal for use in reproduction of a visible image, image processing conditions are adjusted on the basis of image input information detected from the stimulable phosphor sheet, and an image processing is conducted on the image signal by use of the image processing conditions, wherein the improvement comprises the steps of:

(i) in the case where said radiation image is read out from a stimulable phosphor sheet subjected to subdivision image recording conducted by exposing a plurality of subdivisions on said stimulable phosphor sheet respectively to a radiation in the radiation image recording step, discriminating the respective regions of said plurality of subdivisions on the basis of information on said subdivision image recording, (ii) determining said image processing conditions for the respective discriminated regions, and (iii) adjusting said image processing conditions for the respective regions when said image processing is conducted.

The present invention also provides a radiation image read-out apparatus including a means for emitting stimulating rays to a stimulable phosphor sheet carrying a radiation image stored thereon, a means for moving said stimulable phosphor sheet, a light detection means for photoelectrically detecting light emitted by said stimulable phosphor sheet in proportion to the stored radiation energy upon exposure to stimulating rays and obtaining an image signal for use in reproduction of a visible image, and a means for adjusting image processing conditions used in an image processing on the basis of image input information detected from said stimulable phosphor sheet, wherein the improvement comprises constituting said means for adjusting said image processing conditions by:

(i) a means for receiving information on subdivision image recording conducted on said stimulable phosphor sheet by exposing a plurality of subdivisions on said stimulable phosphor sheet respectively to a radiation in a radiation image recording step, and discriminating the respective regions of said plurality of subdivisions on the basis of said information on said subdivision image recording, and (ii) a means for determining said image processing conditions for the respective discriminated regions.

With the radiation image read-out method and apparatus in accordance with the present invention, even though the image input information differs markedly between the subdivisions on the stimulable phosphor sheet in the subdivision image recording, it is possible to adjust the image processing conditions used in the image processing of final read-out image signal to values suitable for the respective image input information at the subdivisions. Accordingly, it becomes possible to always obtain a reproduced visible image having an improved image quality, particularly a high diagnostic efficiency and accuracy.

DESCRIPTION OF THE PREFERRED EMBODIMENTS

The present invention will hereinbelow be described in further detail with reference to the accompanying drawings.

Figure 1:
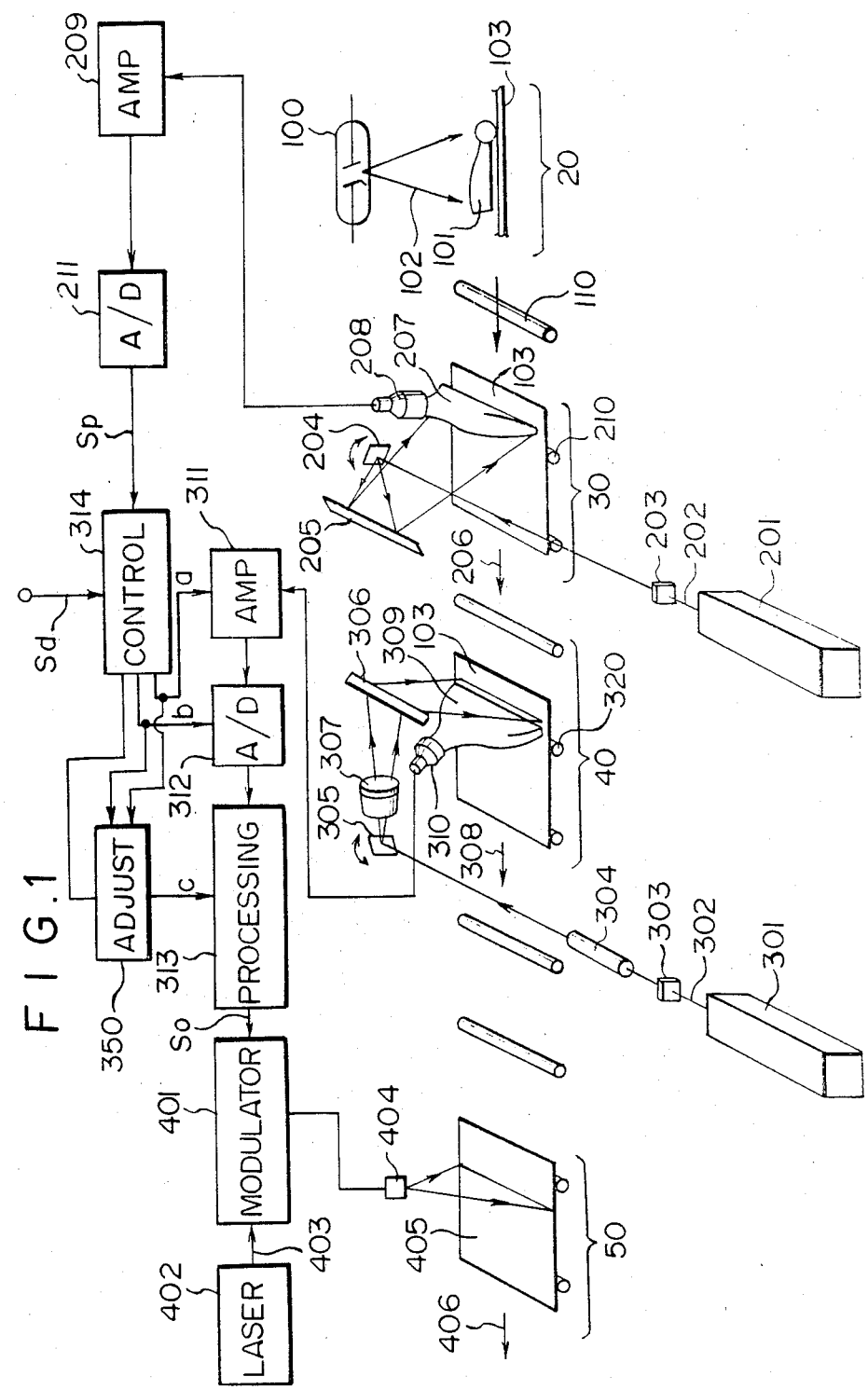
FIG. 1 is a schematic view showing the radiation image recording and reproducing system wherein radiation image read-out is conducted by an embodiment of the radiation image read-out method in accordance with the present invention.

Referring to FIG. 1, the radiation image recording and reproducing system wherein radiation image read-out is conducted by an embodiment of the radiation image read-out method in accordance with the present invention basically comprises a radiation image recording section 20, a preliminary read-out section 30, a final read-out section 40, and an image reproducing section 50. At the radiation image recording section 20, a radiation 102 is emitted by a radiation source 100 constituted by an X-ray tube or the like toward an object 101. A stimulable phosphor sheet 103 for storing radiation energy thereon is placed at the position exposed to the radiation 102 passing through the object 101, and a radiation image of the object 101 is stored on the stimulable phosphor sheet 103.

The stimulable phosphor sheet 103 carrying the radiation image of the object 101 stored thereon is sent to the preliminary read-out section 30 by a sheet conveyance means 110 constituted by a conveyor roller or the like. At the preliminary read-out section 30, a laser beam 202 emanated by a laser beam source 201 is first passed through a filter 203 for cutting off light having a wavelength within a range identical with the range of the wavelength of the light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 emitted thereby has a wavelength distribution different from and far apart from the wavelength distribution of the light emitted by the stimulable phosphor sheet 103 upon stimulation thereof. While the laser beam 202 impinges upon the stimulable phosphor sheet 103, the stimulable phosphor sheet 103 is moved in the direction as indicated by the arrow 206 (i.e. the sub-scanning direction) by a sheet conveying means 210 constituted by conveyor rollers or the like and, thus, the whole surface of the stimulable phosphor sheet 103 is exposed to and scanned by the laser beam 202. The power of the laser beam source 201, the beam diameter of the laser beam 202, the scanning speed of the laser beam 202, and the moving speed of the stimulable phosphor sheet 103 are selected so that the stimulation energy of the laser beam 202 for preliminary read-out is smaller than the stimulation energy of the laser beam for final read-out conducted at the final read-out section 40.

When exposed to the laser beam 202 as mentioned above, the stimulable phosphor sheet 103 emits light in proportion to the radiation energy stored thereon, and the emitted light enters a light guide member 207 which may be of a shape and a material as disclosed in U.S. Pat. No. 4,346,295. The light is guided inside of the light guide member 207 through total reflection, emanated from a light output face of the light guide member 207 and received by a photodetector 208 constituted by a photomultiplier or the like. The light receiving face of the photodetector 208 is closely contacted with a filter for transmitting only light having the wavelength distribution of the light emitted by the stimulable phosphor sheet 103 and cutting off the light having the wavelength distribution of the stimulating rays, so that the photodetector 208 can detect only the light emitted by the stimulable phosphor sheet 103 upon stimulation thereof. The light detected by the photodetector 208 is converted into an electric signal carrying the image input information, and amplified by an amplifier 209. The signal generated by the amplifier 209 is digitized by an A/D converter 211, and sent as a preliminary read-out image signal Sp to a final read-out control circuit 314 at the final read-out section 40. In the case where a single radiation image is stored on the stimulable phosphor sheet 103, i.e. in a case other than subdivision image recording, the final read-out control circuit 314 calculates a read-out gain setting value (a), a scale factor setting value (b), and a reproduced image processing condition setting value (c) by histogram analysis or the like based on the image input information represented by the preliminary read-out image signals Sp over the entire area of the sheet 103.

After the preliminary read-out is finished, the stimulable phosphor sheet 103 is sent to the final read-out section 40. At this section, a laser beam 302 emitted by a laser beam source 301 is first passed through a filter 303 for cutting off light having a wavelength within the range identical with the range of the wavelength of the light emitted by the stimulable phosphor sheet 103 upon stimulation thereof by the laser beam 302. Then, the beam diameter of the laser beam 302 is strictly adjusted by a beam expander 304. The laser beam 302 is then deflected by a light deflector 305 formed of a galvanometer mirror or the like, and is made to impinge upon the stimulable phosphor sheet 103 by a plane reflection mirror 306. Between the light deflector 305 and the plane reflection mirror 306 is positioned an f0 lens 307 for maintaining the beam diameter of the laser beam 302 uniform during the scanning of the laser beam 302 on the stimulable phosphor sheet 103. While the laser beam 302 impinges upon the stimulable phosphor sheet 103, the stimulable phosphor sheet 103 is moved in the direction as indicated by the arrow 308 (i.e. the sub-scanning direction) by a sheet conveying means 320 constituted by conveyor rollers or the like and, consequently, the whole area of the stimulable phosphor sheet 103 is exposed to and scanned by the laser beam 302. Upon exposure to the laser beam 302, the stimulable phosphor sheet 103 emits light in proportion to the radiation energy stored thereon, and the light emitted enters a light guide member 309 which is made of the same material and has the same configuration as the light guide member 207 used for the preliminary read-out. The light emitted by the stimulable phosphor sheet 103 is guided inside of the light guide member 309 through total reflection, emitted from the light output face of the light guide member 309 and received by a photodetector 310 constituted by a photomultiplier or the like. The light receiving face of the photodetector 310 is closely contacted with a filter for selectively transmitting only the light having the wavelength distribution of the light emitted by the stimulable phosphor sheet 103, so that the photodetector 310 can detect only the light emitted thereby.

The output of the photodetector 310 photoelectrically detecting the light emission representing the radiation image stored on the stimulable phosphor sheet 103 is amplified to an appropriate level by an amplifier 311 the read-out gain of which has been adjusted by the read-out gain setting value (a) calculated by the control circuit 314. The amplified electric signal is input to an A/D converter 312 which converts the electric signal into a digital signal by use of a scale factor which has been adjusted by the scale factor setting value (b) to suit the width of signal fluctuation. The digital signal thus obtained is sent to a signal processing circuit 313, in which it is processed on the basis of the reproduced image processing condition setting value (c) so as to obtain a radiation image suitable for viewing, particularly for diagnostic purposes, and is output as a read-out image signal (final read-out image signal) So.

The final read-out image signal So generated by the signal processing circuit 313 is input to a light modulator 401 at the image reproducing section 50. At the image reproducing section 50, a laser beam 403 emitted by a reproducing laser beam source 402 is modulated by the light modulator 401 on the basis of the final read-out image signal So received from the signal processing circuit 313, and is made to impinge upon a photosensitive material 405 such as a photographic film by a scanning mirror 404 for scanning the photosensitive material 405 by the laser beam 403. At this time, the photosensitive material 405 is moved normal to the aforesaid scanning direction, i.e. in the direction as indicated by the arrow 406. Accordingly, the radiation image represented by the final read-out image signal So is recorded on the photosensitive material 405. For reproducing the radiation image, it is also possible to use any other appropriate method such as display on a CRT as referred to earlier.

Figure 2:
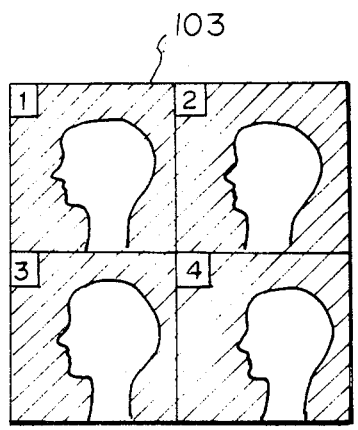
FIG. 2 is a schematic view showing the condition of radiation image recording on a stimulable phosphor sheet.

At the aforesaid radiation image recording section 20, subdivision image recording may be conducted on the stimulable phosphor sheet 103, for example, as shown in FIG. 2. Adjustment of the image processing condition setting value (c) used in image processing (signal processing) of the final read-out image signal So detected from the stimulable phosphor sheet 103 subjected to the subdivision image recording will hereinbelow be described in detail.

Figure 3A:
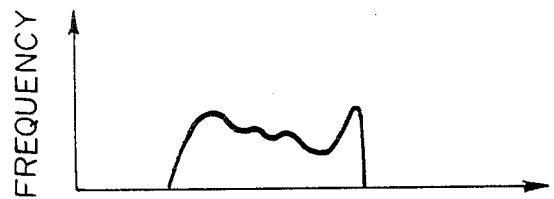
FIGS. 3A, 3B, 3C, 3D and 3E are graphs showing histograms of read-out image signals.
Figure 3B:
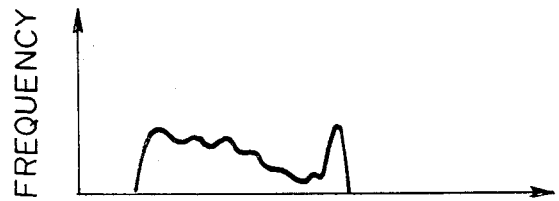
Figure 3C:
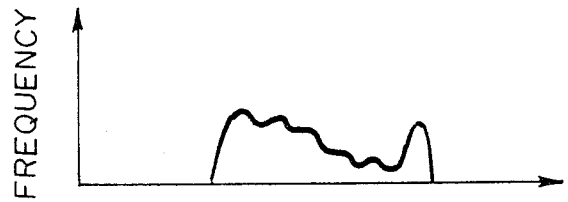
Figure 3D:
Figure 3E:
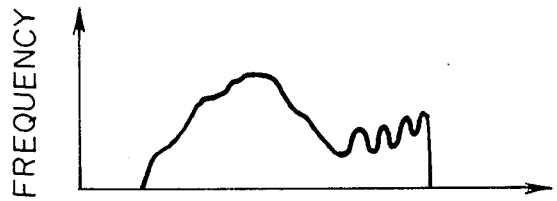

A subdivision image recording signal Sd is entered from a terminal device positioned near the radiation image recording section 20 or the like to the control circuit 314. The subdivision image recording signal Sd represents the subdivision format in the subdivision image recording. For example, when four-on-one subdivision image recording as shown in FIG. 2 is conducted, the subdivision image recording signal Sd representing the four-on-one subdivision is entered to the control circuit 314. The subdivision image recording is conducted in a predetermined format. For example, in the case of four-on-one subdivision image recording, image recording is carried out respectively at four equal subdivisions as shown in FIG. 2. On the other hand, the control circuit 314 stores regions of the subdivisions in the respective formats, and extracts the preliminary read-out image signals Sp at the regions of the respective subdivisions on the basis of the subdivision image recording signal Sd. The control circuit 314 then determines the read-out gain setting value (a) and the scale factor setting value (b) appropriately for the extracted preliminary read-out image signals Sp of the respective regions of the subdivisions. For example, when the preliminary read-out is conducted oh the stimulable phosphor sheet 103 subjected to the subdivision image recording as shown in FIG. 2, the control circuit 314 determines read-out gain setting values a1, a2, a3 and a4 and scale factor setting values b1, b2, b3 and b4 respectively for subdivisions 1, 2, 3 and 4. Also, based on all preliminary read-out image signals Sp, the control circuit 314 determines a read-out gain setting value a0, a scale factor setting value b0 and an image processing condition setting value c0 suitable for the image input information represented by all preliminary read-out image signals Sp. Specifically, for example, in the case where the control circuit 314 is constituted to determine the read-out gain setting value (a) and the scale factor setting value (b) on the basis of the histogram of the preliminary read-out image signals Sp and the histograms of the preliminary read-out image signals Sp at the subdivisions 1, 2, 3 and 4 are respectively as shown in FIGS. 3A, 3B, 3C and 3D, the histogram of all preliminary read-out image signals Sp becomes as shown in FIG. 3E. The control circuit 314 determines the read-out gain setting values a1, a2, a3, a4 and a0 and the scale factor setting values b1, b2, b3, b4 and b0 on the basis of the histograms shown in FIGS. 3A, 3B, 3C, 3D and 3E, and determines the image processing condition setting value c0 based on the histogram shown in FIG. 3E.

The control circuit 314 stores the read-out gain setting values a1, a2, a3 and a4 and the scale factor setting values b1, b2, b3 and b4 determined as mentioned above in conformity with the subdivisions 1, 2, 3 and 4 in a storage means, and stores the read-out gain setting value a0, the scale factor setting value b0 and the image processing condition setting value c0 in the storage means. When the final read-out is conducted at the final read-out section 40, the control circuit 314 sends the read-out gain setting value a0 and the scale factor setting value b0 based on all preliminary read-out image signals Sp respectively to the amplifier 311 and the A/D converter 312, and has the final read-out by adjusting the read-out gain to the value a0 and the scale factor to the value b0.

Figure 4:
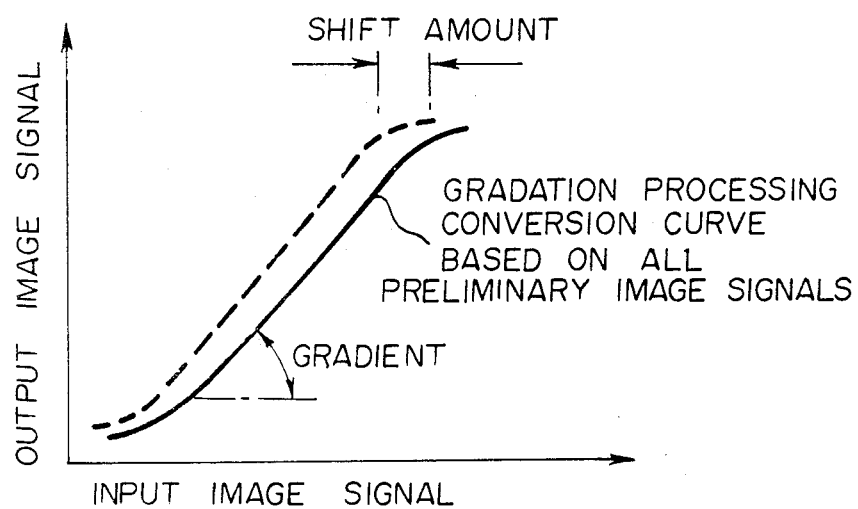
FIG. 4 is a graph showing an example of a gradation processing conversion curve.

The final read-out image signal So obtained by the final read-out conducted by use of the read-out conditions adjusted as described above is subjected to image processing (signal processing) in the signal processing circuit 313 as mentioned above. By way of example, the image processing in this embodiment is gradation processing, and the condition (c) for the gradation processing is adjusted for the respective subdivisions 1, 2, 3 and 4 in the subdivision image recording. This adjustment will now be described in detail below. First, the gradation processing condition c0 determined by the control circuit 314 on the basis of all preliminary read-out image signals Sp is converted by a condition adjusting circuit 350 in the manner described later, and sent to the signal processing circuit 313. The gradation processing condition c0 represents a gradation processing conversion curve as shown in FIG. 4. When the gradation processing is carried out on the final read-out image signal So by the signal processing circuit 313, the read-out gain setting values a0, a1, a2, a3 and a4 and the scale factor setting values b0, b1, b2, b3 and b4 from the control circuit 314 are sent to the condition adjusting circuit 350. The condition adjusting circuit 350 recognizes the subdivision at which the final read-out is being effected at the moment by, for example, receiving a synchronizing signal in synchronization with the operations of the light deflector 305 and the sheet conveying means 320. On the basis of the read-out gain setting value a1, a2, a3 or a4 and the scale factor setting value b1, b2, b3 or b4 corresponding to said subdivision where the final read-out is being effected at the moment, i.e. either one of the subdivisions 1, 2, 3 and 4, the condition adjusting circuit 320 calculates a factor A by which the gradient of the gradation processing conversion curve represented by the gradation processing condition c0 should be multiplied, and a shift amount B for the respective subdivisions i, wherein i denotes 1, 2, 3 or 4, by the formulas $A_i = b_i/b_0$ $B_i = m \cdot b_0(a_i - a_0)$.

Thus, for example, for the final read-out image signal So at the subdivision 1, the gradation processing is conducted by use of a gradation processing conversion curve obtained by multiplying the gradient of the gradation processing conversion curve based on all preliminary read-out image signals Sp, i.e. the gradation processing conversion curve represented by the gradation processing condition c0, by a factor $A_1 = b_1/b_0$, and shifting said gradation processing conversion curve based on all preliminary read-out image signals Sp by a shift amount $B_1 = m \cdot b_0(a_1 - a_0)$, wherein m designates a factor (apparatus constant) for converting the amount of light emitted by the stimulable phosphor sheet 103 to a digital image signal.

As described above, the gradation processing is carried out on the final read-out image signal So by changing the gradation processing conversion curve between the subdivisions on the stimulable phosphor sheet 103 subjected to the subdivision image recording. As a result, the density ranges of the visible radiation images reproduced at the respective subdivisions by the image reproducing section 50 on the basis of the final read-out image signal So become approximately uniform, and it is possible to obtain visible images having an improved image quality, particularly a high diagnostic efficiency and accuracy.

In the case where the radiation image recording section 20 and the preliminary read-out section 30 are connected by the sheet conveyance means 110 or the like and respective stimulable phosphor sheets 103 are conveyed to the preliminary read-out section 30 in the sequence of image recording, subdivision image recording signals Sd may be entered to the control circuit 314 merely in the sequence of image recording. Specifically, for example, the control circuit 314 may be provided with a storage means for sequentially storing the subdivision image recording signals Sd for the respective stimulable phosphor sheets 103, and may be constituted so that reading of the signals Sd from the storage means is carried out in the sequence of signal storing in synchronization with the preliminary read-out. In this case, it is possible to use the respective subdivision image recording signals Sd for the aforesaid signal extraction in exact conformity with the respective stimulable phosphor sheets 103.

On the other hand, in the case where the radiation image recording section 20 and the preliminary read-out section 30 are positioned independently of each other and the stimulable phosphor sheets 103 are not necessarily sent to the preliminary read-out in the order of image recording, identification codes such as bar codes inherent to the respective stimulable phosphor sheets 103 should be entered to the control circuit 314 together with the subdivision image recording signals Sd, and the subdivision image recording signals Sd should be stored in the storage means in conformity with the identification codes. In this case, the identification code is read from the stimulable phosphor sheet 103 in the preliminary read-out step, and the subdivision image recording signal Sd corresponding to the identification code is read from the storage means and used for signal extraction.

For a stimulable phosphor sheet 103 on which a single radiation image is recorded over the entire recording region, the aforesaid signal extraction should not be conducted by the control circuit 314. For this purpose, for example, the subdivision image recording signal Sd should not be entered to the control circuit 314 for such a stimulable phosphor sheet 103, and the control circuit 314 should be constituted so that it determines a single read-out gain setting value (a) and a single scale factor setting value (b) based on all preliminary read-out image signals Sp.

In the aforesaid embodiment, the gradation processing conditions as one type of the image processing conditions are changed between the subdivisions on the basis of the read-out gain in the amplifier 311 and the scale factor in the A/D converter 312 which constitute the final read-out conditions. For example, in the case where a photomultiplier is used as the photodetector 310, a high voltage applied to the photomultiplier also constitutes the read-out conditions governing the read-out sensitivity. The present invention is applicable also to the case where the image processing conditions such as the gradation processing conditions are adjusted to values suitable for the respective subdivisions on the basis of the high voltage applied to the photomultiplier and the other read-out conditions.

Also, the image processing conditions need not necessarily be adjusted based on the final read-out conditions. For example, the image processing conditions suitable for the image input information on the stimulable phosphor sheet 103 may be stored in the storage means, and the image processing conditions may be read from the storage means and determined in accordance with the image input information ascertained from the preliminary read-out image signals Sp at the respective subdivisions in the subdivision image recording. Instead of conducting the preliminary read-out, the image input information on the stimulable phosphor sheet 103 may also be ascertained from the final read-out image signal So.

Figure 5:
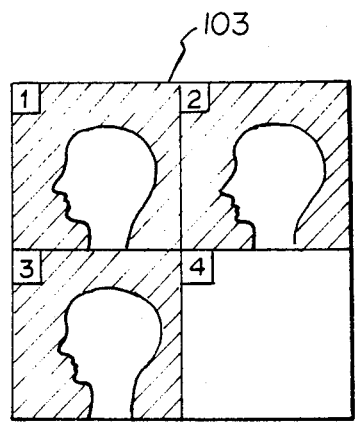
FIG. 5 is a schematic view showing the condition of radiation image recording on a stimulable phosphor sheet.

As shown in FIG. 5, radiation image recording is not necessarily conducted at all subdivisions on the stimulable phosphor sheet 103. Therefore, besides the subdivision format, a signal representing the subdivisions at which image recording is actually conducted may be entered as the subdivision image recording signal Sd into the control circuit 314, and the control circuit 314 may be constituted to discriminate a subdivision, at which image recording is not conducted, on the basis of the subdivision format and the signal representing the subdivisions at which image recording is actually conducted, and not to determine the read-out conditions and the image processing conditions for the discriminated subdivision. In this case, it is also unnecessary to send the final read-out image signal So at the discriminated subdivision to the image reproducing section 50. Therefore, for the subdivision at which the image read-out conditions and the image processing conditions are not adjusted, a signal representing the minimum density may be generated automatically by the A/D converter 312 or the like. In this case, it becomes possible to prevent black points or the like caused by a noise component from arising at the region where no image recording is conducted. Also, for the subdivision at which the image read-out conditions and the image processing conditions are not adjusted, the final read-out may be omitted. In this case, it is possible to avoid unnecessary final read-out time and to shorten the final read-out processing time.

Further, in the case where the irradiation field in the radiation image recording step is limited at the respective subdivisions, the irradiation field should preferably be detected when the image processing conditions are determined for the respective subdivisions, and the image processing conditions should be determined on the basis of the preliminary read-out image signals Sp only within the detected irradiation field. As a result, the determined image processing conditions become free from adverse effects of the preliminary read-out image signals Sp outside of the irradiation field, and become more suitable for the image input information on the object. In order to detect the irradiation field, a method as proposed in Japanese Patent Application No. 59(1984)-160355 may be used.

As described, for example, in Japanese Unexamined Patent Publication No. 58(1983)-67242, a single read-out system may also be used for the preliminary read-out and the final read-out. In this case, after the preliminary read-out is finished, the stimulable phosphor sheet is returned to the read-out system by a sheet conveying means and the final read-out is then carried out. In the preliminary read-out step, the energy of the stimulating rays is adjusted to be lower than the energy of the stimulating rays used in the final read-out. The present invention is applicable also to such a case.

I claim:

1. A radiation image read-out method in which a stimulable phosphor sheet carrying a radiation image of an object stored thereon is exposed to stimulating rays, light emitted by the stimulable phosphor sheet in proportion to the stored radiation energy when the stimulable phosphor sheet is exposed to the stimulating rays is photoelectrically detected by a light detection means to obtain an image signal for use in reproduction of a visible image, image processing conditions are adjusted on the basis of image input information detected from the stimulable phosphor sheet, and an image processing is conducted on the image signal by use of the image processing conditions, wherein the improvement comprises the steps of:
   (i) in the case where said radiation image is read out from the stimulable phosphor sheet subjected to subdivision image recording conducted by exposing a plurality of subdivisions on said stimulable phosphor sheet respectively to a radiation in the radiation image recording step, discriminating the respective regions of said plurality of subdivisions on the basis of information on said subdivision image recording,
   (ii) determining said image processing conditions for the respective discriminated regions, and
   (iii) adjusting said image processing conditions for the respective regions when said image processing is conducted.

2. A method as defined in claim 1 wherein preliminary read-out is conducted for approximately detecting the image input information on said stimulable phosphor sheet by exposing said stimulable phosphor sheet to the stimulating rays of a level lower than the level of the stimulating rays used in final read-out before said final read-out is conducted for obtaining said image signal, and said image processing conditions are adjusted on the basis of the information obtained by said preliminary read-out.

3. A method as defined in claim 2 wherein image read-out conditions in said final read-out are adjusted on the basis of said information obtained by said preliminary read-out, and said image processing conditions are adjusted on the basis of said image read-out conditions in said final read-out.

4. A method as defined in claim 3 wherein said image processing conditions are gradation processing conditions, and a gradation processing conversion curve used in the gradation processing is adjusted on the basis of said image read-out conditions.

5. A method as defined in any of claims 1 to 4 wherein said information on said subdivision image recording comprises a subdivision format and information on said subdivisions at which radiation image recording is conducted.

6. A method as defined in claim 2, 3 or 4 wherein an irradiation field limited in the radiation image recording step is detected at each of said subdivisions, and said image processing conditions are determined on the basis of said information obtained by said preliminary read-out only within said detected irradiation field.

7. A radiation image read-out apparatus including a means for emitting stimulating rays to a stimulable phosphor sheet carrying a radiation image stored thereon, a means for moving said stimulable phosphor sheet, a light detection means for photoelectrically detecting light emitted by said stimulable phosphor sheet in proportion to the stored radiation energy upon exposure to stimulating rays and obtaining an image signal for use in reproduction of a visible image, and a means for adjusting image processing conditions used in an image processing on the basis of image input information detected from said stimulable phosphor sheet, wherein the improvement comprises constituting said means for adjusting said image processing conditions by:

(i) a means for receiving information on subdivision image recording conducted on said stimulable phosphor sheet by exposing a plurality of subdivisions on said stimulable phosphor sheet respectively to a radiation in a radiation image recording step, and discriminating the respective regions of said plurality of subdivisions on the basis of said information on said subdivision image recording, and (ii) a means for determining said image processing conditions for the respective discriminated regions.

8. An apparatus as defined in claim 7 wherein said apparatus includes a final read-out system and a preliminary read-out system respectively comprising said means for emitting stimulating rays, said means for moving said stimulable phosphor sheet, and said light detection means, the level of the stimulating rays in said preliminary read-out system being lower than the level of the stimulating rays in said final read-out system, and said means for determining said image processing conditions determines said image processing conditions on the basis of information obtained by preliminary read-out carried out by said preliminary read-out system.

* * * * *